United States Patent
Cook et al.

(10) Patent No.: US 11,223,533 B2
(45) Date of Patent: *Jan. 11, 2022

(54) AUTOMATIC NOISE PROFILE GENERATION

(71) Applicant: CenturyLink Intellectual Property LLC, Broomfield, CO (US)

(72) Inventors: Charles I. Cook, Louisville, CO (US); Paul A. Keator, Elizabeth, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/579,505

(22) Filed: Sep. 23, 2019

(65) Prior Publication Data
US 2020/0021494 A1   Jan. 16, 2020

Related U.S. Application Data

(63) Continuation of application No. 14/977,838, filed on Dec. 22, 2015, now Pat. No. 10,425,285.

(60) Provisional application No. 62/164,712, filed on May 21, 2015.

(51) Int. Cl.
*H04L 12/24* (2006.01)
*H04L 29/08* (2006.01)
*H04L 12/66* (2006.01)
*H04L 12/26* (2006.01)
(Continued)

(52) U.S. Cl.
CPC ............... *H04L 41/12* (2013.01); *H04B 3/32* (2013.01); *H04L 12/66* (2013.01); *H04L 43/08* (2013.01); *H04L 67/10* (2013.01); *H04L 67/30* (2013.01); *H04W 4/80* (2018.02)

(58) Field of Classification Search
CPC ......... H04L 41/12; H04L 67/30; H04L 12/66; H04L 43/08; H04L 67/10; H04B 3/32; H04W 4/80
See application file for complete search history.

(56) References Cited

U.S. PATENT DOCUMENTS

2009/0034592 A1* 2/2009 Mirfakhraei ............. H04B 3/32
375/222
2009/0323903 A1* 12/2009 Cioffi .................... H04B 1/1027
379/32.01
(Continued)

*Primary Examiner* — Hamza N Algibhah
*Assistant Examiner* — James Ross Hollister

(57) ABSTRACT

A system for noise profile generation includes a customer gateway communicatively coupled to one or more end devices over a communication medium, at least one noise information node communicatively coupled to the customer gateway and programmed to extract noise information present on a communication path from the customer gateway to at least one of the one or more end devices, a noise profile database storing one or more noise profiles, and a noise profile generator. The noise profile generator includes at least one processor and non-transitory computer readable media having a set of instructions executable by the at least one processor to retrieve the extracted noise information associated with the communication path, determine whether the at least one noise characteristic of the extracted noise information matches with one or more noise profiles and identify at least one noise source on the communication path.

18 Claims, 7 Drawing Sheets

(51) Int. Cl.
*H04W 4/80* (2018.01)
*H04B 3/32* (2006.01)

(56) References Cited

U.S. PATENT DOCUMENTS

| | | | |
|---|---|---|---|
| 2012/0093240 A1* | 4/2012 | McFarland | H04B 3/54 375/257 |
| 2013/0279552 A1* | 10/2013 | Gomez Martinez | H04L 25/03 375/219 |
| 2013/0290507 A1* | 10/2013 | Drooghaag | H04L 41/14 709/223 |
| 2014/0153624 A1* | 6/2014 | Wolcott | H04B 15/00 375/224 |
| 2015/0029869 A1* | 1/2015 | Wolcott | H04B 3/487 370/242 |
| 2015/0124891 A1* | 5/2015 | Hwang | H04L 1/20 375/257 |
| 2016/0295325 A1* | 10/2016 | Enenkl | H04R 3/04 |
| 2016/0344592 A1 | 11/2016 | Cook et al. | |
| 2019/0306028 A1* | 10/2019 | Lee | H04L 12/4625 |

\* cited by examiner

AUTOMATIC NOISE PROFILE GENERATION

CROSS-REFERENCES TO RELATED APPLICATIONS

This application is a continuation of U.S. Provisional patent application Ser. No. 14/977,838, filed on Dec. 22, 2015 by Charles I. Cook, entitled, "Automatic Noise Profile Generation," which claims priority to U.S. Provisional Patent Application Ser. No. 62/164,712, filed on May 21, 2015 by Charles I. Cook and Paul A. Keator, entitled, "Automatic Noise Profile Generation," the disclosures of each of which are incorporated herein by reference, in their entirety, and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network diagnostics, and more particularly to a system for noise profile generation for diagnosing problematic line noise sources.

BACKGROUND

Network communications and network devices are often susceptible performance degradation due to noise and interference introduced by various external sources. For example, wireless communications over Wi-Fi may be interfered with by emissions in the same frequency band by household devices such as microwave ovens, cordless phones, baby monitors, Bluetooth devices, remote controls, car alarms, home security and surveillance systems, and other similar devices. Other Wi-Fi networks, within range and utilizing the same frequency band, may also contribute to noise and interference. Similarly, external noise sources may create significant problems in other communication technologies, such as power line communications, digital subscriber line (xDSL), and other wired and wireless communications.

As household appliances and electronic devices become increasingly interconnected, each appliance and device may further be a source of noise. Typically, to improve network performance, network users will relocate within their premises increase signal strength by moving closer to the signal source, or decrease noise strength by moving away from a noise source or area with noise. Under normal circumstances, network users typically guess as to the source of noise by removing all suspected devices, or staying away from a general area. However, these methods rely on guessing, and trial and error. Moreover, it is often impractical for a network user to remove or shut off devices and appliances in a blind attempt to improve network performance.

As is well understood in the art, signal-to-noise ratio (SNR) can limit channel capacity and bandwidth over a communication channel. Conventional techniques exist for detecting noise, and avoiding or mitigating noise on the communication channel. However, conventional techniques are unable to identify a source of the noise on the communication channel. Thus, a system for automatic noise profile generation is presented by the embodiments below.

BRIEF SUMMARY

According to a set of embodiments, a system, apparatus, and method for automatic noise profile generation are provided.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for automatic noise profile generation may include a customer gateway communicatively coupled to one or more end devices over a communication medium, at least one noise information node communicatively coupled to the customer gateway, wherein each of the at least one noise information node is programmed to extract an extracted noise information present on a communication path from the customer gateway to at least one of the one or more end devices and the extracted noise information comprises at least one noise characteristic, a noise profile database storing one or more noise profiles wherein each of the one or more noise profiles is respectively associated with at least one noise source, and a noise profile generator having at least one processor, and non-transitory computer readable media having encoded thereon computer software comprising a set of instructions. According to a set of embodiments, the set of instructions may be executable by the at least one processor to retrieve, from the at least one noise information node, the extracted noise information associated with the communication path, determine whether the at least one noise characteristic of the extracted noise information matches with one or more noise profiles at the noise profile database, generate, in response to determining that at least one noise characteristic of the extracted noise information does not match with the one or more noise profiles, a new noise profile based on the extracted noise information, associate, at the noise profile database, at least one of the one or more end devices with the new noise profile, and identify, based on either the new noise profile or a matching noise profile of the one or more noise profiles, the at least one noise source on the communication path.

In another set of embodiments, the communication medium may include one of a power line at a customer premises, twisted pair cable, coaxial cable, or optical fiber. In some embodiments, the communication medium may be a wireless connection for at least one of Wi-Fi, Bluetooth, infrared, near-field, or Z-Wave communications. In various embodiments, each of the at least one noise information node may have a unique identifier and is further programmed to identify a new end device connected to the communication path, and the noise profile generator may further include instructions executable to identify, at the noise information database, existing noise information associated with the communication path, based on the unique identifier, subtract the existing noise information from the extracted noise information resulting in an added noise information, and generate, based on the added noise information, an isolated noise profile associated with the new end device.

In further embodiments, the communication medium may include a transmission spectrum, wherein the transmission spectrum includes a plurality of sub-carrier channels, each sub-carrier channel spanning a respective frequency range within the transmission spectrum. Each of the at least one noise information node may be a wireless transceiver programmed to receive, from the customer gateway, a signal on each of the plurality of sub-carrier channels, wherein the extracted noise information is extracted respectively from each of the plurality of subcarrier channels, and determine, based on the extracted noise information, a signal-to-noise ratio respectively for each of the sub-carrier channels. In some embodiments, the transceiver may include at least one of a discrete multitone (DMT) receiver or an orthogonal frequency division multiple access (OFDMA) receiver.

In another set of embodiments, crosstalk noise may be cancelled from the extracted noise information, wherein the crosstalk noise of a near-end transceiver of the at least one customer node is canceled with the crosstalk noise of a corresponding far-end transceiver of the at least one customer node. In some embodiments, the set of instructions of the noise profile generator may further include instructions that cause the processor to identify, based on the new noise profile or the matching noise profile, at least one secondary end device on a second communication path. In further embodiments, the at least one noise characteristic may include a frequency spectrum of the noise signal, noise spectral density, transient markers, time of day of occurrence, or occurrence patterns.

In another aspect, a noise profile generator is provided having at least one processor and non-transitory computer readable media having encoded thereon computer software comprising a set of instructions. The set of instructions may be executable by the at least one processor to retrieve, via a noise information repository, extracted noise information associated with a communication path between a communication gateway and one or more end devices, utilizing a communication medium, determine whether at least one noise characteristic of the extracted noise information matches with one or more noise profiles at a noise profile database, generate, in response to determining that at least one noise characteristic of the extracted noise information does not match with the one or more noise profiles, a new noise profile based on the extracted noise information, associate, at the noise profile database, at least one of the one or more end devices with the new noise profile, and identify, based on either the new noise profile or a matching noise profile of the one or more noise profiles, at least one noise source on the communication path.

According to one set of embodiments, the communication medium may be one of a power line at a customer premises, twisted pair cable, coaxial cable, or optical fiber. In other embodiments, the communication medium may be a wireless connection for at least one of Wi-Fi, Bluetooth, infrared, near-field, or Z-Wave communications. In a further set of embodiments, the set of instructions may further include instructions that cause the processor to identify, at the noise information database, existing noise information associated with the communication path, subtract the existing noise information from the extracted noise information resulting in an added noise information, and generate, based on the added noise information, an isolated noise profile associated with the new end device.

In another set of embodiments, the communication medium may utilize a transmission spectrum, wherein the transmission spectrum includes a plurality of sub-carrier channel, each sub-carrier channel spanning a respective frequency range within the transmission spectrum. The set of instructions may correspondingly include instructions that cause the processor to retrieve, via the noise information repository, extracted noise information respectively from each of the plurality of sub-carrier channels, wherein the extracted noise information is extracted respectively from each of the subcarrier channels, and determine, based on the extracted noise information, a signal-to-noise ratio respectively for each of the sub-carrier channels. In some embodiments, the noise profile generator may further cancel, from the extracted noise information, a crosstalk noise, wherein the crosstalk noise of a near-end transceiver on the communication path is canceled with the crosstalk noise of a corresponding far-end transceiver on the communication path.

In a further set of embodiments, the set of instructions may further include instructions that cause the processor to identify, based on the new noise profile or the matching noise profile, at least one secondary end device on a second communication path. In some embodiments, the at least one noise characteristic may further include a frequency spectrum of the noise signal, power spectral density, transient markers, time of day of occurrence, or occurrence patterns.

In another aspect, a method of noise profile generation is provided. In various embodiments, the method may include extracting, via an at least one noise information node, noise information present on a communication path from the customer gateway to at least one of one or more end devices, the communication path utilizing a communication medium, transmitting, via the at least one noise information node, the extracted noise information to a noise information repository, retrieving, via the noise information repository, the extracted noise information associated with the communication path, determining, via a noise profile generator, whether at least one noise characteristic of the extracted noise information matches with one or more noise profiles at a noise profile database, wherein each of the one or more noise profiles comprises at least one noise characteristic derived from noise information, wherein each of the one or more noise profiles is respectively associated with at least one noise source, generating, via the noise profile generator, in response to determining that at least one noise characteristic of the extracted noise information does not match with the one or more noise profiles, a new noise profile based on the extracted noise information, associating, at the noise profile database, at least one of the one or more end devices with the new noise profile, and identifying, based on either the new noise profile or a matching noise profile of the one or more noise profiles, the at least one noise source on the communication path.

According to one set of embodiments, the method may further include identifying, via the at least one noise information node, a new end device connected to the communication path, identifying, at the noise profile database, existing noise information associated with the communication path, subtracting, via the noise profile generator, the existing noise information from the extracted noise information resulting in an added noise information, and generating, via the noise profile generator, an isolated noise profile associated with the new end device, based on the added noise information. In another set of embodiments, the communication medium may include a transmission spectrum, wherein the transmission spectrum includes a plurality of sub-carrier channel, each sub-carrier channel spanning a respective frequency range within the transmission spectrum, the method further including retrieving, via the noise information repository, extracted noise information respectively from each of the plurality of sub-carrier channels, wherein the extracted noise information is extracted respectively from each of the subcarrier channels, and determining, based on the extracted noise information, a signal-to-noise ratio respectively for each of the sub-carrier channels.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
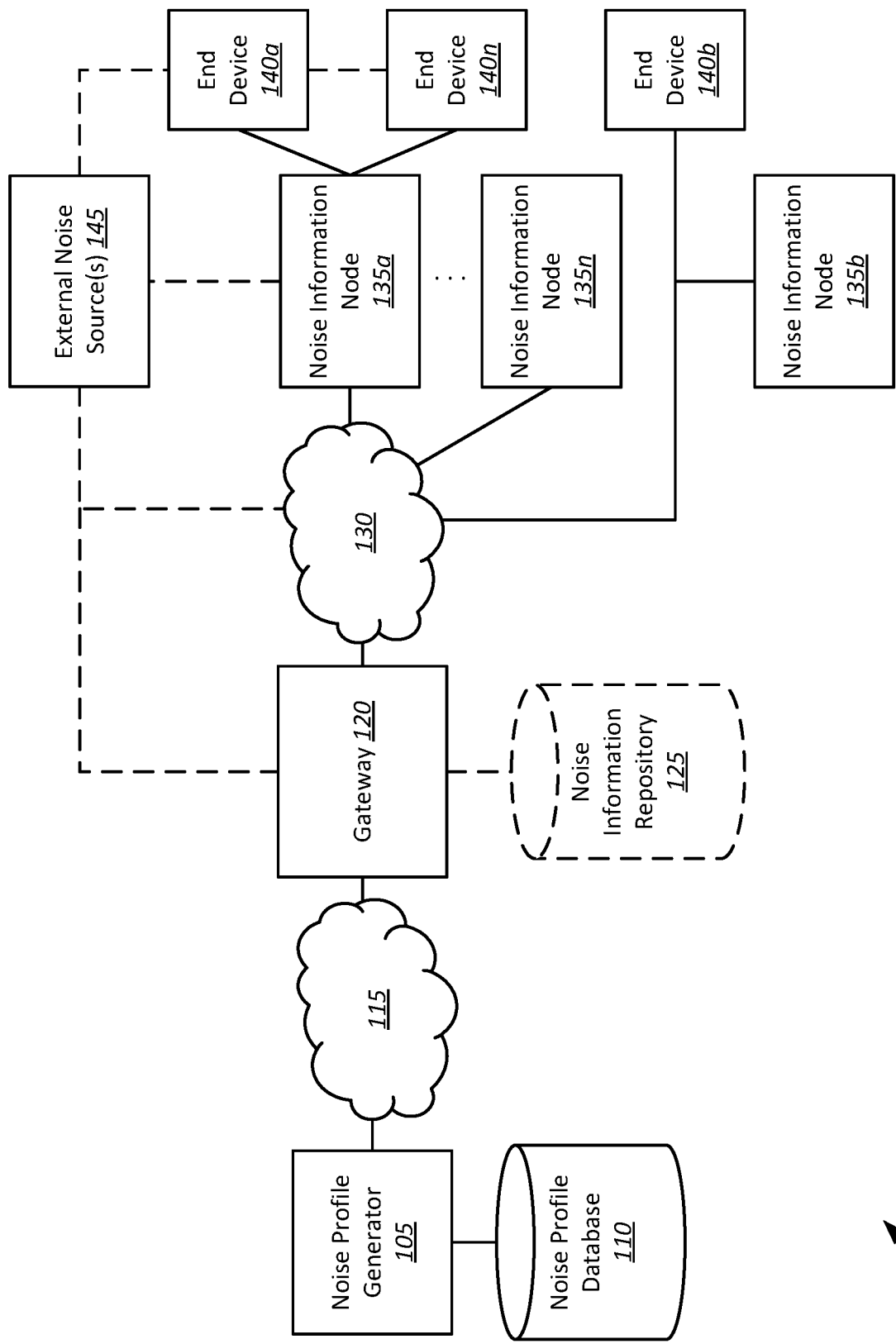
FIG. 1 is a schematic block diagram of a system for automatic noise profile generation, in accordance with various embodiments.

FIG. 1 illustrates an automatic noise profile generation system 100, in accordance with various embodiments. The system 100 includes a noise profile generator 105, noise profile database 110, service provider network 115, gateway 120, noise information repository 125, local network 130, noise information nodes 135a, 135b, 135n (collectively 135), end devices 140a, 140b, 140n (collectively 140), and one or more external noise sources 145. In various embodiments, the automatic noise profile generation system 100 may allow for the identification of problematic noise sources, and enable a targeted approach for improving SNR and network performance based on an individual noise source or group of noise sources 145.

According to various embodiments, the noise profile generator 105 may be communicatively coupled to a noise profile database 110. In some embodiments, the noise profile database 110 may be hosted locally at the noise profile generator 105, or alternatively, the noise profile database 110 may be hosted on an external device. The noise profile generator 105 may further be communicatively coupled to a gateway device 120 via service provider network 115. The gateway 120 may be communicatively coupled to a noise information repository 125. Similar to the noise profile database 110, in some embodiments, the noise information repository 125 may be hosted locally at the gateway 120, while in other embodiments the noise information repository 125 may be hosted on an external device. For example, in various embodiments, the noise profile database 110 or noise information repository 125 may include, or be implemented in, hardware or software components of the noise profile generator 105, or gateway 120, respectively. In one set of embodiments, either of the noise profile database 110 or noise information repository 125 may comprise a software application, or other executable code for storing, accessing, and managing noise profiles and noise information, respectively. In some embodiments, either of the noise profile database 110 or information repository 125 may include, without limitation, a system on a chip (SoC), application specific integrated circuit (ASIC), field programmable gate array (FPGA), or other similarly programmable embedded system programmed to store, allow access to, and manage noise profiles and noise information, respectively. In various further embodiments, an external device hosting the noise profile database 110, or noise information repository 125, may also include similar hardware or software resources. The external device may include a computing device, separate from the noise profile generator 105 or gateway 120, such as, but not limited to, a database server, application server, web server, a network drive, or other similar device that is accessibly by the noise profile generator 105 or gateway 120.

The gateway device 120 may further be communicatively coupled to one or more end devices 140 via a local network 130, and through one or more noise information nodes 135. In the embodiments depicted, the noise information node 135a allows end device 140a through end device 140n to connect to the local network 130, where the end device 140n indicates a final end device of a of plurality of end devices 140 connected to noise information node 135a. In some embodiments, the noise information node 135a may provide communication functionality, such as routing and forwarding communications to and from the end devices 140. In other embodiments, the noise information node 135b may not necessarily route or forward communications to the end devices 140, and may be coupled to a communication medium between end device 140b and local network 130, so as to be able to listen in on the communications. In yet further embodiments, the noise information node 135n may itself be an end device, in direct communication with the local network 130, to the gateway 120. In one set of embodiments, each of the end devices 140 may further be connected to one or more other end devices 140.

In various embodiments, customer premises equipment, including the gateway 120, one or more noise information nodes 135, and one or more end devices 140 may further be in communication with, or affected by one or more external noise sources 145. Thus, in one set of embodiments, the one or more external noise sources 145 may be separate from one or more communication paths connecting the gateway 120, via local network 130, to any of the noise information nodes 135 or end devices 140, yet still the one or more external noise sources 145 may still affect communications on the one or more communication paths. In other embodiments, the external noise sources may be in communication with the customer premises equipment, including the gateway device 120, network elements of the local network 130, the noise information nodes 135, or end devices 140.

In various embodiments, each of the one or more communication paths from the gateway 120 to noise information nodes 135 or end devices 140 may utilize one or more communication media. For example, in some embodiments, each of the communication paths may utilize a common communication medium, while in other embodiments each of the communication paths may utilize different communication mediums. In yet further embodiments, any single communication path may utilize a combination of different communication media.

For example, according to various sets of embodiments, the local network 130 may include all or part of the communication paths to the noise information nodes 135 or end devices 140. The local network 130 may be a wired or wireless network, which includes wired and wireless communication mediums. Wired communication networks may employ various communication media, including, but not limited to, in-home power lines and power wiring for power line communications (PLC); twisted pair—including Cat 5, Cat 5e, Cat 6, other Ethernet cables, and telephone cables; and optical fiber. Wireless communication networks may employ various communication media, including, but not limited to, Wi-Fi, Bluetooth, infrared, radio frequency (RF), and cellular communications. In some further embodiments, a combination of both wired and wireless communication media may be utilized.

In various embodiments, end device 140 may be connected to one or more noise information node 135, gateway 120, other end device 140, or a network element of local network 130, which include, but are not limited to, routers, access points, and the like. The end devices 140 may include, without limitation, any of a personal computer, set top box, voice over internet protocol (VoIP) phone, smart phone, tablet, laptop computer, or other computing device. In some embodiments, the end devices 140 may further include, without limitation, smart appliances, smart thermostats, smart lights, and other home automation devices.

Similarly, in various embodiments, the one or more external noise source 145 may be communicatively connected to one or more noise information node 135, gateway 120, other network elements of local network 130, or end devices 140. In one set of embodiments, the external noise sources 145 may communicate over a wired connection, while in other embodiments, the external noise sources 145 may communicate wirelessly. In further sets of embodiments, the external noise sources 145 may not be connected to the local network 130, or by the gateway 120, one or more noise information nodes 135, and end devices 140, or respective communication media utilized by the local network 130, gateway 120, noise information nodes 135, or end devices 140, but may emit signals that electrically interfere with the communication media.

As described above, in various embodiments, the noise information node 135 may be a modem, network switch, hub, router, or access point of the local network 130. In some embodiments, the noise information node 135 may itself be an end device. In further sets of embodiments, some or all of the noise information node 135 may be included in the gateway 120, or may be included as part of a digital subscriber line access multiplexer (DSLAM), cable modem termination system (CMTS), optical network terminal (ONT), optical line termination (OLT), or other similar aggregator device for multiple subscriber premises. In yet further embodiments, the noise information node 135b may be a device dedicated to detecting line noise on a communication medium. In each of the described embodiments, the noise information node 135 may be a computer system controlled by the communications service provider, programmed to listen to, track, store, and manage noise information at a customer premises. In a further set of embodiments, the gateway 120 may include at least part of the noise information node 135.

According to one set of embodiments, the gateway 120 may be a digital subscriber line (DSL) modem, set top box (STB), voice over internet protocol (VoIP) gateway, or other customer premises device. In various embodiments, the gateway 120 may employ discrete multitoned (DMT) modulation and demodulation techniques to transmit and receive communications, to and from a DSLAM, over a service provider network 115. In various embodiments, the DSLAM, gateway 120, or both DSLAM and gateway 120 may include one or more vectoring engines. In such embodiments, vectoring may be utilized by the DSLAM to implement self far-end crosstalk (FEXT) cancellation techniques, also known as G. Vector, in DSL networks such as, without limitation, a very-high-bit-rate digital subscriber line 2 (VDSL2) networks, G.Fast networks, and other xDSL networks utilizing DMT modulation. In such embodiments, the DSLAM, DSL modem, or both, may detect and cancel FEXT noise by injecting an inverse to cancel the detected line noise. In some embodiments, the inverse noise signal may invert the polarity of the detected line noise signal, while in other embodiments, the line noise signal may be phase-shifted. In some further embodiments, the gateway device 120 may further be able to detect line noise of a local network 130 of the customer premises. For example, line noise, such as FEXT noise introduced by the various end devices 140 may be measured from within the local network 130. Thus, the DSLAM, gateway 120, or both DSLAM and gateway 120 may further be capable of monitoring and measuring noise information. As such, in one set of embodiments, the DSLAM or gateway 120 may further comprise at least part of the one or more of the noise information repositories 135.

In various embodiments, the gateway 120 may optionally be communicatively coupled to a noise information repository 125. The noise information repository 125 may store the detected line noise, received from the gateway 120, as noise information in the noise information repository 125. In one set of embodiments, the noise information may be a snapshot of the vectoring engine of the gateway 120 or DSLAM. In various embodiments, noise information may include, respectively: the noise signal itself, such as, without limitation, a noise signal waveform; and information, attributes, and characteristics related to the noise signal, such as, without limitation, a frequency spectrum of the noise signal, a noise spectral density, transient markers, a time or date of occurrence, a range of times and dates of occurrence, or occurrence patterns.

According to various embodiments, the noise profile generator 105 may include dedicated hardware or software running on a dedicated device, or may be software that is executable on existing network hardware. For example, in one set of embodiments, the noise profile generator 105 may include, or be hosted by, a dedicated server, such as an application server or web server. In a further set of embodiments, the noise profile generator 105 may include application specific embedded systems, including, without limitation, an ASIC, SoC, or FPGA based device. In other sets of embodiments, the noise profile generator 105 may be included in or executed on, without limitation, a DSLAM, optical line termination, a cellular tower or base station, a wireless access point, or other suitable device for receiving noise information from one or more subscribers, as reported via respective subscriber gateways 120 for each of the one or more subscribers.

In various embodiments, the noise profile generator 105 may include one or more microprocessors, and non-transitory computer readable media, and be programmed to perform various processes in the automatic generation of a noise profile from noise information. For example, in one set of embodiments, the noise profile generator 105 may be programmed to retrieve, from the gateway 120, or in some embodiments, the noise information repository 125 associated with the gateway 120, noise information for a customer premises associated with the gateway. The noise information stored in the noise information repository 125 may include the noise information detected and reported by the one or more noise information nodes 135. For example, in some embodiments, the noise information may include line noise detected by noise information node 135a, on a communication path between the gateway 120 and one or more end devices 140a, 140n in communication with the gateway 120 through noise information node 135a. Thus, noise information node 135a may measure and record line noise for any of the communication paths between the gateway 120 to each of end device 140a through end device 140n, between noise information node 135a and each of end device 140a through 140n, between the gateway 120 and noise information node 135a, and between each of the end devices 140a-140n. In an alternative arrangement, noise information node 135b may directly monitor line noise on the communication path between an end device 140b in directly communication with gateway 120 through local network 130. In yet another set of embodiments, the noise information node 135n itself may be an end device and detect line noise on the communication between itself and the gateway 120.

In various embodiments, the noise information node 135 may include, in addition to the detected line noise, additional information, attributes, and characteristics regarding the line noise, such as a noise signal waveform; and information, attributes, and characteristics related to the noise signal, such as, without limitation, a frequency spectrum of the noise signal, a noise spectral density, transient markers, a time or date of occurrence, a range of times and dates of occurrence, or occurrence patterns. The measured line noise itself, together with the additional information, attributes, characteristics, and measurements, may be packaged by the noise information node 135 and transmitted as noise information. In one set of embodiments, each of the noise information nodes 135 may transmit the noise information to the gateway device 120 to be stored in noise information repository 125. In other embodiments, the noise information nodes 135 may be able to report noise information directly to the noise profile generator 105, and the noise profile generator 105 may likewise be able to retrieve noise information directly from the noise information node 135.

In various embodiments, once the noise information has been retrieved, the noise profile generator 105 may determine, for the particular noise information, if a noise profile exists in the noise profile database 110 that has at least one matching noise characteristic with the noise information. If no such noise profile exists, the noise profile generator 105 may generate a noise profile based on the noise information. In various embodiments, the noise profile, in addition to including the noise information, may include at least one of an identifier for the subscriber or customer premises, an identifier for at least one end device associated with the communication path from which the noise information was extracted from, a type of end device such as a model or manufacturer, identified changes to end devices sharing the communication medium, changes to a segment of the communication path, or the type of communication medium utilized on the communication path. If a matching noise profile is found in the noise profile database 110, the noise profile generator 105 may instead identify one of the associated end device 140, end device 140 type, identified end device changes sharing the communication path or communication medium, changes to the communication path itself, or type of communication medium utilized as common to any of the end device, communication path, or communication medium from which the noise information was extracted. In this manner, a noise source may be identified as, for example, the external noise source 145, or one of the end devices 140.

External noise sources 145 may include, without limitation, household devices and appliances, such as microwave ovens, cordless phones, baby monitors, radio transmitters, peripheral devices and accessories, Bluetooth devices, remote controls, car alarms, home security and surveillance systems, and other similar devices. Therefore, in various embodiments, the one or more external noise sources 145 may be devices connected to one or more of the gateway 120, local network 130, noise information nodes 135, or end devices 140. The one or more external noise sources 145 may be connected to, or in communication with, the gateway 120 directly, local network 130, noise information nodes 135, or end devices 140. For example, in some embodiments, a direct connection from the one or more external noise sources 145 may include both wired and wireless connections over which the one or more external noise sources 145 may communicate, or otherwise interfere with. For example, in some embodiments, the one or more external noise sources 145 may communicate wirelessly with one or more end devices 140, such as wireless keyboards, mice, and other peripherals, that may interfere with other wireless communications between the one or more end devices 140, with the gateway 120, or other local network 130.

In other embodiments, the one or more external noise sources 145 may only indirectly affect communications to and from the gateway 120 directly, local network 130, noise information nodes 135, end devices 140, or the communication media carrying these communications. For example, in some embodiments, the one or more external noise sources 145 may emit RF noise, such as in the case of microwave oven, high frequency transceivers, electric motors, and certain fluorescent light fixtures. Alternatively, line noise may be caused through capacitive, inductive, or conductive effects, and co-channel interference, as in the crosstalk noise, or from adjacent channel interference effects. In a further set of embodiments, the external noise source 145 may itself be one of the end devices 140, or a component of a network device of local network 130 or gateway 120.

In various embodiments, all or part of the automatic noise profile generation system 100 may be implemented as part of a software defined network (SDN), network function virtualization (NFV), or cloud network environment. For example, in some embodiments, any of the noise profile generator 105, noise profile database 110, service provider network 115, gateway 120, noise information repository 125, local network 130, noise information nodes 135, end devices 140, or external noise sources 145 may be implemented as a virtual machine, as part of a virtualized network, or as a resource available on a cloud network. In some further embodiments, one or more of the capabilities provided by any of the noise profile generator 105, noise profile database 110, service provider network 115, gateway 120, noise information repository 125, local network 130, noise information nodes 135, end devices 140, or external noise sources 145 may be provided as a virtualized network function.

Figure 2:
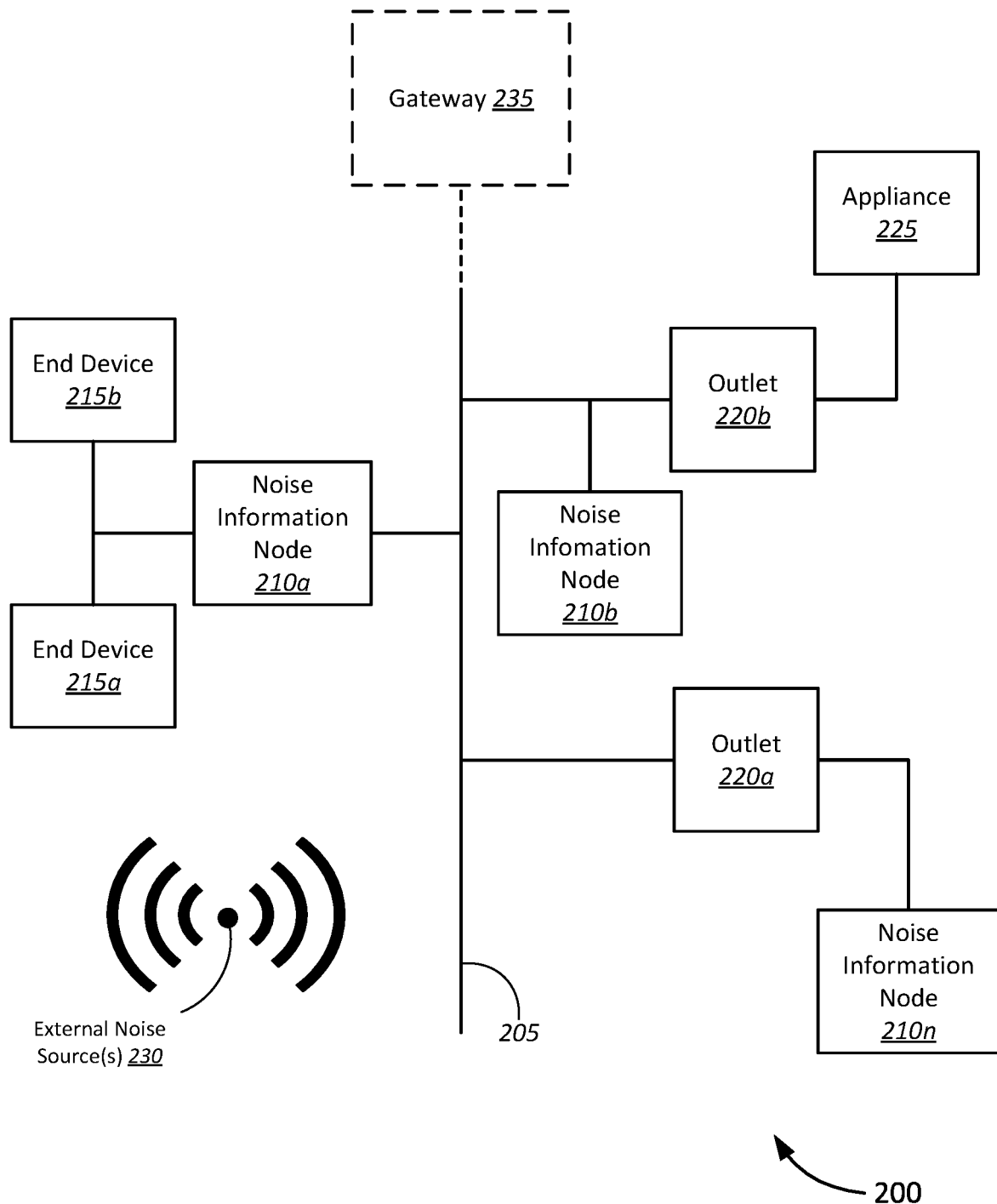
FIG. 2 is a schematic block diagram of a customer premises wired network topology, in accordance with various embodiments.

FIG. 2 illustrates a customer premises facing arrangement for a system 200 for automatic noise profile generation, in accordance with various embodiments. The system 200 may include a communication medium 205, one or more noise information nodes 210a-210n (collectively 210), end devices 215a, 215b, wall outlets 220a, 220b, appliance 225, one or more external noise sources 230, and gateway 235. In various embodiments, the system 200 may be a customer premises facing local network through which a subscriber's end devices 215a, 215b and appliances 225 may be connected to a gateway 235.

According to a set of embodiments, the system 200 may be a wired communications network utilizing as a communication medium 205, without limitation, a suitable twisted pair cabling such as Category 5, 5e, and 6 Ethernet Cables; telephone lines; DSL lines; coaxial cabling; optical fiber, or other suitable communication. In other embodiments, the system 200 may be a PLC network, utilizing in-home electrical wiring for power of a customer's premises. In such embodiments, the in-home electrical wiring may be used as the communication medium 205 including, without limitation, various heat and water resistant, insulated copper or aluminum wire cabling, or wire cabling using another suitable conductor.

Accordingly, in embodiments utilizing an Ethernet or other wired communications network, the noise information node 210a may include, without limitation, a router, modem, switch, forwarder, access point, or other communication hub through which the end devices 215a, 215b may be able to communicate with the gateway 235. In other sets of embodiments, the noise information nodes 210 may be a power line communication adapter, a smart power outlet, or a separate dedicated device communicatively coupled to the communication medium 205. In yet further embodiments, the noise information node 210n may itself be an end device 215, 225. In various embodiments, household appliance 225 may be an end device 215 communicating over communication medium 205. For example, the household appliance 225 may include, without limitation, smart thermostats, smart lights, smart refrigerators, or other smart appliances and home automation devices.

In some embodiments, the noise information node 210 may be a hub through which communications to and from the end devices 215 may be conducted, and to which each of the end devices may be connected. Alternatively, in some embodiments, the noise information node may be a dedicated device communicatively coupled to the communication path to and from an end device 215, 225. Accordingly, the noise information nodes 210 may be able to identify noise information on the communication path to and from end devices 215, 225, between the end devices 215, 225 and with the gateway 235.

In various embodiments, external noise sources 230 may include, without limitation, end devices and appliances, such as microwave ovens, cordless phones, baby monitors, radio transmitters, peripheral devices and accessories, Bluetooth devices, remote controls, car alarms, home security and surveillance systems, and other similar devices. Therefore, in various embodiments, the one or more external noise sources 230 may be devices connected to one or more of the gateway 235, noise information nodes 210, or end devices 215. In other embodiments, the external noise sources 230 may include, in some embodiments, an appliance 225 or other device coupled to the communication medium 205 to receive power through outlets 220a, 220b causing noise on the communication medium 205. In some further embodiments, the one or more external noise sources 230 may include other devices, such as nearby electric motors, cell towers, radio or television towers, or other high-power RF transmitters that may cause line noise in a wired communication medium 205.

Figure 3:
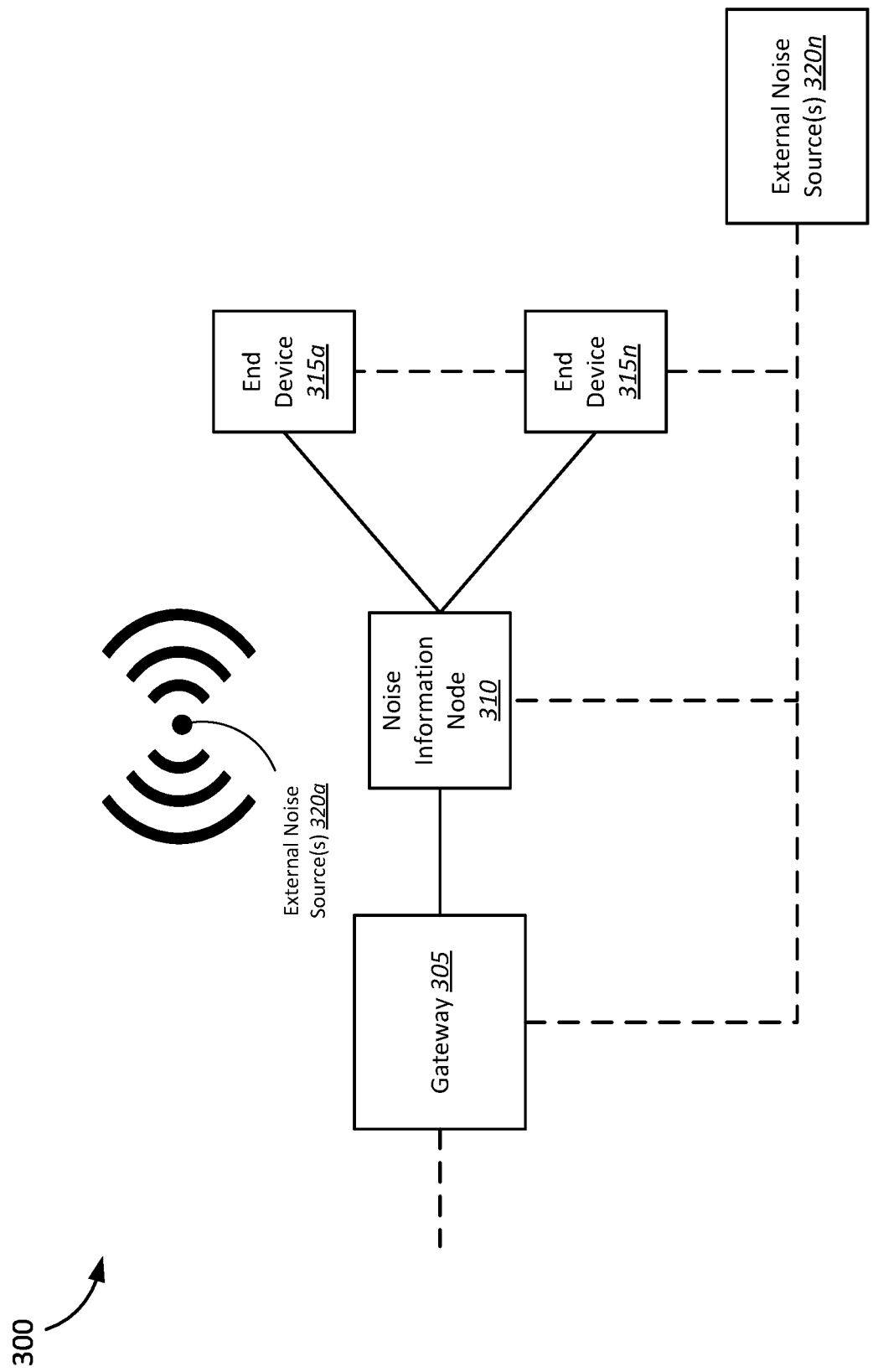
FIG. 3 is a schematic block diagram of a customer premises wireless network topology, in accordance with various embodiments.

FIG. 3 illustrates a customer premises facing arrangement for a system 300 for automatic noise profile generation in a wireless environment, in accordance with various embodiments. The system 300 may include a communication gateway 305, noise information node 310, end devices 315a-315n (315 collectively), and external noises sources 320a-320n (320 collectively). In various embodiments, the system 300 may include a wireless local network through which a subscriber's end devices 315 may be connected to the gateway 305.

According to various embodiments, the wireless local network may employ various communication media, including, but not limited to, Wi-Fi, Bluetooth, infrared, radio frequency (RF), and cellular communications. In some further embodiments, a combination of both wired and wireless communication media may be utilized. Accordingly, in one set of embodiments, the end devices 315 may be in communication with gateway 305 via noise information node 310, with noise information node 310 acting as a communication hub between the end devices 315 and gateway 305. For example, the noise information node 310 may include, without limitation, a wireless router or wireless access point. In other embodiments, alternative configurations may provide for the end devices 315 to be in direct communication with the gateway 305, with noise information node 310 communicatively coupled to the communication path between the end devices 315 and gateway 305 to listen to signal noise over the communication path. For example, in various embodiments, the communication path may include one or more subcarrier channels, utilized by each of the end devices 315a-315n, on which the noise information node 310 may monitor and detect signal noise. Accordingly, in one set of embodiments, the system 300 may be utilized, for example, by a service provider or customer representative, to help a customer to diagnose and troubleshoot connection issues on a subscriber's home network, as will be described in more detail below with respect to FIGS. 4A-4C.

The one or more external noise sources 320a may be a noise source originating from outside of the local network, such as radio broadcasts and transmissions causing noise or interference on the frequency spectrum of the communication medium used by the wireless local network. The one or more noise sources 320n, in contrast, may include various devices in direct communication with any of the end devices 315, noise information node 310, or gateway 305. For example, in various embodiments, the one or more external noise sources 320n may include, without limitation, one or more other end devices 315, or a device connected to one of the end devices 315, noise information node 310, or gateway 305 directly.

Figure 4A:
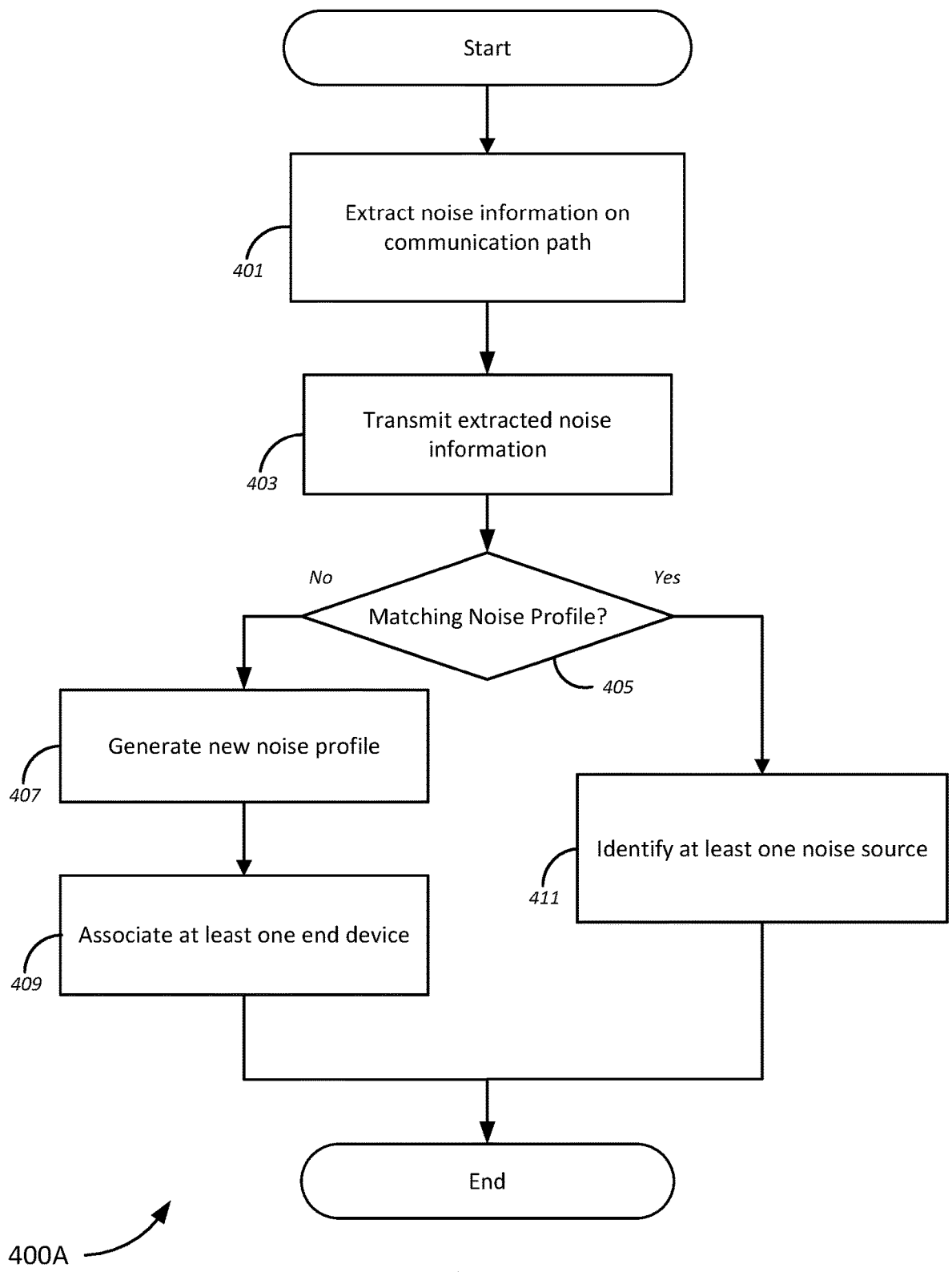
FIG. 4A is a flow diagram of a method for a system for automatic noise profile generation, in accordance with various embodiments.

FIG. 4A is a flow diagram of a method 400A for a system for automatic noise profile generation, in accordance with various embodiments. The method 400 begins, at block 401, by extracting, via a noise information node, noise information present on a communication path. In various embodiments, the noise information node may extract noise information from one or more different communication paths, including, without limitation, communication paths between the gateway and an end device; two different end devices; or an end device and a communication hub, such as a router, access point, or network switch. The various communication paths may further encompass various communication media for carrying wired and wireless communications. In various embodiments, the noise information may include, the noise signal itself, as detected on the communication path, such as, without limitation, a noise signal waveform; and information, attributes, and characteristics related to the noise signal, such as, without limitation, a frequency spectrum of the noise signal, a noise spectral density, transient markers, a time or date of occurrence, a range of times and dates of occurrence, or occurrence patterns. In one set of embodiments, the noise information may be a snapshot of a vectoring engine implemented on a DSLAM, CMTS, or gateway.

At block 403, the extracted noise information may be transmitted, by the noise information node, to a noise information repository. In various embodiments, the noise information repository may be accessible through a residential or commercial gateway. In one set of embodiments, the noise information repository may be hosted locally at the gateway. In other embodiments, the noise information repository may be hosted on an external device. As described with respect to the embodiments above, the noise information repository may include hardware, software, or a combination of both, operable to store, access, and manage noise information received from the noise information node, or multiple noise information nodes. Accordingly, the noise information repository may store noise information received from one or more noise information nodes, for one or more communication paths respectively.

At decision block 405, a noise profile generator may determine whether the noise information retrieved from the noise information repository matches any of the noise profiles on a noise profile database. For example, in one set of embodiments, once the noise profile generator has retrieved the noise information, the noise profile generator may determine, for the noise information, if a noise profile exists in the noise profile database that has at least one noise characteristic in common with the a noise characteristic of the noise information. In various embodiments, the noise profile, in addition to including the noise information, may include at least one of an identifier for the subscriber or customer premises, location information regarding the customer premises, an identifier for at least one end device associated with the communication path from which the noise information was extracted from, a type of end device, a model or manufacturer of the end device, an inventory of end devices connected to the communication medium, individual segments between nodes of the communication path, or the type of communication medium utilized on the communication path. In various embodiments, the location information may include, without limitation, geographic coordinates specifying the latitudinal and longitudinal positions of the customer premises. The end device identifier may include, without limitation, a serial number such as an electronic serial number (ESN) or international mobile equipment identity (IMEI), a hardware address such as a media access control (MAC) address, network address, a user name, ID or profile, or other suitable techniques known to those skilled in the art.

At block 407, if no such noise profile exists, the noise profile generator may generate a new noise profile based on the noise information. For example, at block 409, the noise profile generator may associate at least one of the one or more end devices with the noise profile. In various embodiments, the noise profile generator may determine, based on the noise information, or as indicated by the gateway, each of the one or more end devices associated with the communication path from which the noise information was extracted. An end device identifier for each of the identified end devices may then be associated with the noise information in the noise profile. In some further embodiments, end device identifiers for each end device communicatively coupled to the communication medium may also be associated with the noise information in the noise profile.

If a matching noise profile is found in the noise profile database, at block 411, the noise profile generator may then identify an at least one noise source for the noise information based on the noise profile. For example, in one set of embodiments, the noise profile generator may determine that at least one noise characteristic of the noise information matches with a noise characteristic of the noise profile. The noise profile generator may then identify, in the noise profile, at least one of an identifier for the subscriber or customer premises, location information regarding the customer premises, an identifier for at least one end device associated with the communication path from which the noise information was extracted from, a type of end device, a model or manufacturer of the end device, an inventory of end devices connected to the communication medium, individual segments between nodes of the communication path, or the type of communication medium utilized on the communication path. The noise profile generator may then identify, at least one end device, on the customer premises, that is associated with the communication path or communication medium from which the noise information was extracted, or location information of the customer premises. The noise profile generator may utilize any common end devices, or geographic proximity of the customer premises, to identify at least one noise source for the noise information.

Figure 4B:
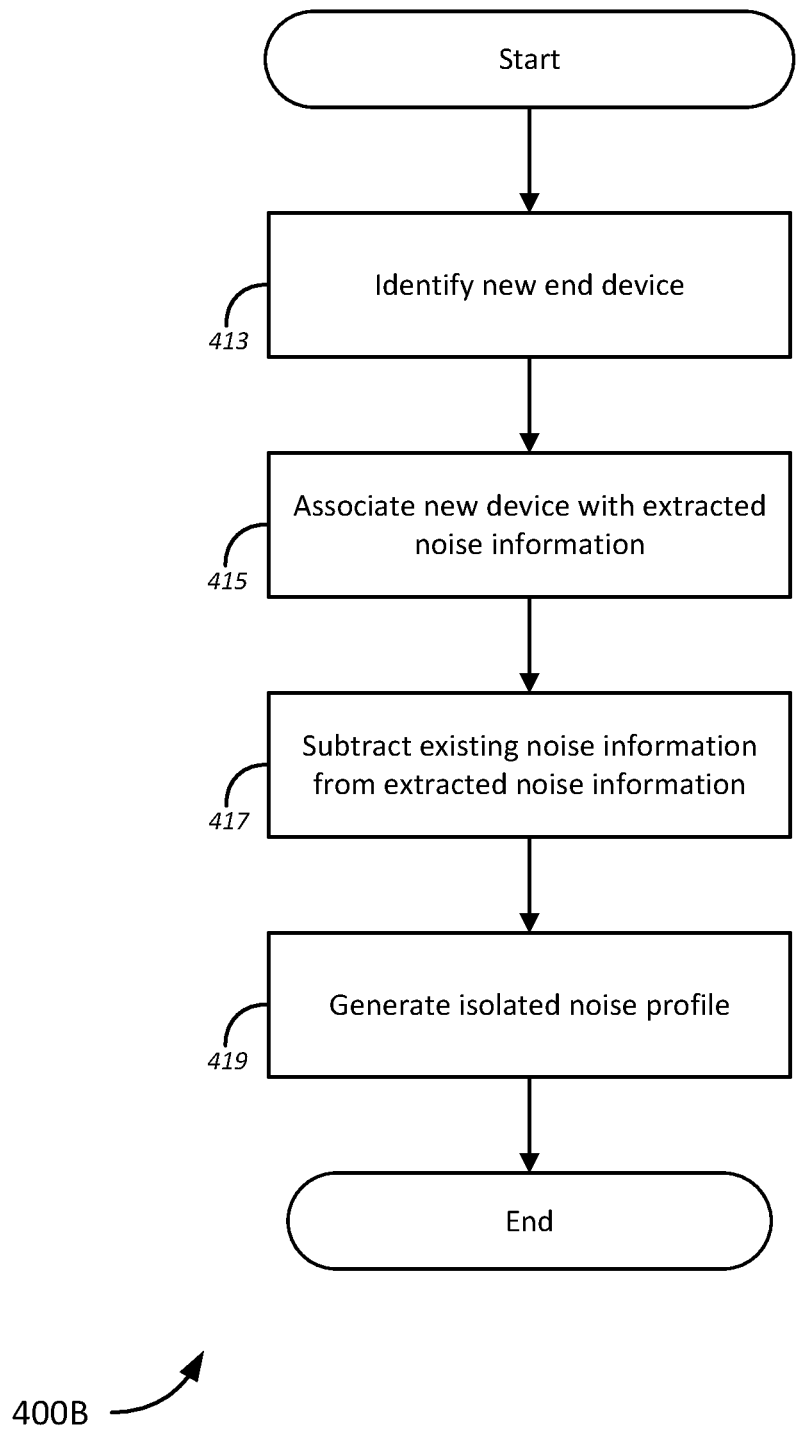
FIG. 4B is a flow diagram of a method for isolating added noise from a newly connected device, in accordance with various embodiments.

FIG. 4B is a flow diagram of a method 400B of isolating added noise from a newly connected device in a system for automatic noise profile generation, in accordance with various embodiments. At block 413, a new end device that has been connected to the communication path or communication medium is identified. In various embodiments, the noise information node, gateway, noise profile generator, or a combination of some or all of the noise information node, gateway, and noise profile generator, may identify a unique identifier of the newly connected end device.

At block 415, the unique identifier of the new end device may be associated with the extracted noise information. As described above with respect to FIG. 4A, the unique identifier may include any of a serial number such as an electronic serial number (ESN) or international mobile equipment identity (IMEI), a hardware address such as a media access control (MAC) address, network address, a user name, user profile, or other suitable techniques known to those skilled in the art.

At block 417, existing noise information, associated with the communication path, may be subtracted from the extracted noise information. In various embodiments, existing noise information, associated with the communication path, may be identified based on subscriber information, location information for the customer premises, or other suitable information that may be included in at least one of the existing noise information or noise profile. In one set of embodiments, a noise signal associated with the existing noise information may be subtracted from a noise signal associated with the extracted noise information. In another set of embodiments, some frequency components of the noise signal may be suppressed based on noise characteristics of the existing noise information, such as a noise spectral density of the existing noise signal.

At block 419, an isolated noise profile may be generated from the resulting noise signal. In various embodiments, the resulting noise signal may result in the added noise signal from the new end device. Accordingly, the isolated noise profile may be generated, based on the added noise signal, characterizing noise added by the new end device to the communication path.

Figure 4C:
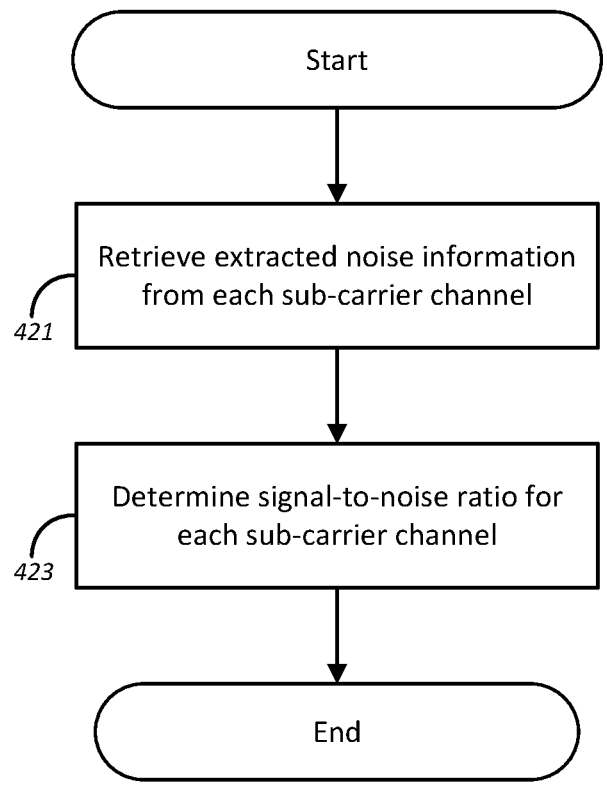
FIG. 4C is a flow diagram of a method for automatic noise profile generation on a multi-carrier modulated communication medium, in accordance with various embodiments.

FIG. 4C is a flow diagram of a method 400C for automatic noise profile generation on a multi-carrier modulated communication medium, in accordance with various embodiments. The method 400C begins, at block 421, by retrieving the extracted noise information from each of a plurality of sub-carrier channels of a communication path or communication medium. In various embodiments, the communication medium or communication path may use DMT modulation and demodulation techniques to transmit and receive communications. For example, in one set of embodiments, the communication medium may include a transmission spectrum, which may be divided into a plurality of smaller frequency bands, or sub-carrier channels, over the communications may take place contemporaneously between the DSLAM and multiple gateways such as DSL modems, or the DSL modem and multiple end devices. In various embodiments, instead of a DSL environment utilizing DMT, the communication path or communication medium may instead utilize an orthogonal frequency division multiplexing (OFDM) scheme for dividing the frequency spectrum into a plurality of sub-carrier channels. For example, OFDM may be utilized for communication channels for, without limitation, cellular data communications, and communications utilizing worldwide interoperability for microwave access (WiMAX), long term evolution (LTE), Wi-Fi, or other standards. Thus, the communication path may include any paths taken by wireless transmissions to and from a suitable orthogonal frequency division multiple access (OFDMA) receiver. Accordingly, in various embodiments, the gateway, noise information node, or both, may be DMT or OFDMA wireless transceivers.

At block 423, a respective SNR may be determined for each of the plurality of subcarrier channels. In various embodiments, based on the SNR, the noise profile generator may further identify which sub-carrier channel of the plurality of sub-carrier channels is most affected by the noise signal. In further embodiments, the noise profile generator may further determine, based on the sub-carrier channel, an at least one noise source for signal noise. In a further set of embodiments, the SNR for multiple sub-carrier channels may be used to more accurately determine the noise source.

Figure 5:
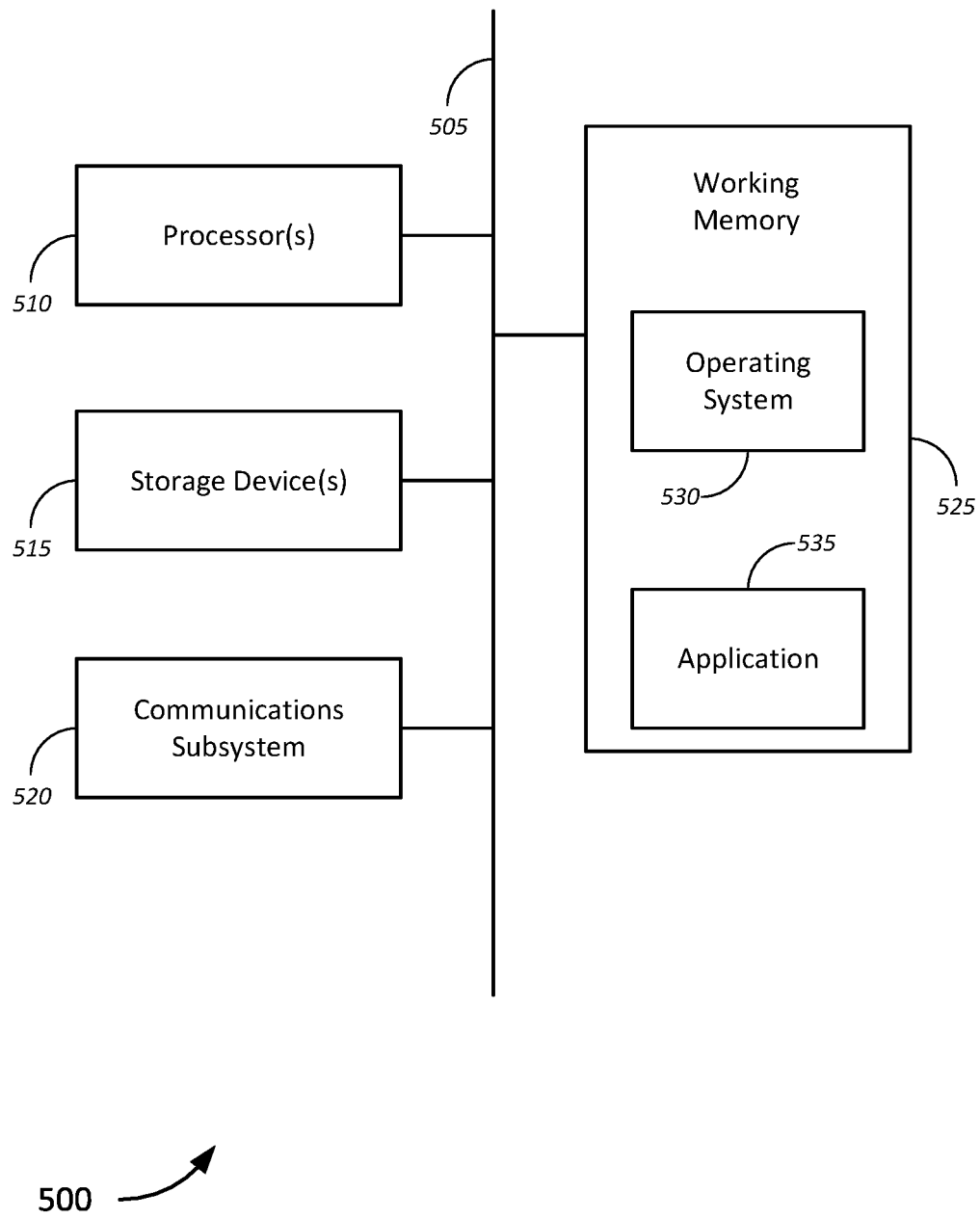
FIG. 5 is a schematic block diagram of computer hardware for a noise profile generator, in accordance with various embodiments.

FIG. 5 is a schematic block diagram of a computer architecture for a noise profile generator, in accordance with various embodiments. FIG. 5 provides a schematic illustration of one embodiment of a computer system 500 that can perform the methods provided by various other embodiments, as described herein, and/or can perform the functions noise profile generator, noise information node, gateway, end device, or any other computer systems as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or integrated manner.

The computer system 500 includes a plurality of hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, and/or the like). In general, embodiments can employ as a processor any device, or combination of devices, that can operate to execute instructions to perform functions as described herein. Merely by way of example, and without limitation, any microprocessor (also sometimes referred to as a central processing unit, or CPU) can be used as a processor, including without limitation one or more complex instruction set computing (CISC) microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing (RISC) microprocessors, such as the IBM Power™ line of processors, processors employing chip designs by ARM Holdings™, and others can be used in many embodiments. In further embodiments, a processor might be a microcontroller, embedded processor, embedded system, SoC or the like.

As used herein, the term "processor" can mean a single processor or processor core (of any type) or a plurality of processors or processor cores (again, of any type) operating individually or in concert. Merely by way of example, the computer system 500 might include a general-purpose processor having multiple cores, a digital signal processor, and a graphics acceleration processor. In other cases, the computer system might 500 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors 510 have been described herein for illustrative purposes, these examples should not be considered limiting.

The computer system 500 may further include, or be in communication with, one or more storage devices 515. The one or more storage devices 515 can comprise, without limitation, local and/or network accessible storage, or can include, without limitation, a disk drive, a drive array, an optical storage device, a solid-state drive, flash-based storage, or other solid-state storage device. The solid-state storage device can include, but is not limited to, one or more of a random access memory (RAM) or a read-only memory (ROM), which can be programmable, flash-updateable, or the like. Such storage devices may be configured to implement any appropriate data stores, including, without limitation, various file systems, database structures, or the like.

The computer system 500 might also include a communications subsystem 520, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 520 may permit data to be exchanged with a customer premises, residential gateway, authentication server, a customer facing cloud server, network orchestrator, host machine servers, other network elements, or combination of the above devices, as described above. Communications subsystem 520 may also permit data to be exchanged with other computer systems, and/or with any other devices described herein, or with any combination of network, systems, and devices. According to some embodiments, the network might include a local area network (LAN), including without limitation a fiber network, or an Ethernet network; a wide-area network (WAN); a wireless wide area network (WWAN); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, the Bluetooth protocol, or any other wireless protocol; or any combination of these or other networks.

In many embodiments, the computer system 500 will further comprise a working memory 525, which can include a RAM or ROM device, as described above. The computer system 500 also may comprise software elements, shown as being currently located within the working memory 525, including an operating system 530, device drivers, executable libraries, and/or other code. The software elements may include one or more application programs 535, which may comprise computer programs provided by various embodiments, and/or may be designed to implement methods and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 530 and/or other code, such as an application program 535) contained in the working memory 525. Such instructions may be read into the working memory 525 from another computer readable medium, such as one or more of the storage device(s) 515. Merely by way of example, execution of the sequences of instructions contained in the working memory 525 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 515. Volatile media includes, without limitation, dynamic memory, such as the working memory 525.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 520 (and/or components thereof) generally will receive the signals, and the bus 505 then might carry the signals (and/or the data, instructions, etc. carried by the signals) to the processor(s) 510, or working memory 525, from which the processor(s) 510 retrieves and executes the instructions. The instructions received by the working memory 525 may optionally be stored on a storage device 515 either before or after execution by the processor(s) 510.

According to a set of embodiments, the computer system 500 may be a noise profile generator in communication with a noise information repository, noise information node, noise profile database, and one or more end devices. In various embodiments, each of the noise information repository, noise information node, noise profile database, and one or more end devices may themselves include one or more hardware elements similar to computer system 500.

According to various sets of embodiments, the computer system 500 may include computer readable media, having stored thereon a plurality of instructions, which, when executed by the processor 510, allows the computer system 500 to retrieve, from a noise information repository, and via the communications subsystem 520, extracted noise information associated with a communication path between a gateway and one or more end devices utilizing a communication medium. The computer system 500 may determine whether at least one noise characteristic of the extracted noise information matches with one or more noise profiles at a noise profile database. In response to determining that at least one noise characteristic of the extracted noise information does not match with the one or more noise profiles, the computer system may generate a new noise profile based on the extracted noise information. The noise profile database may then associate, at the noise profile database, at least one of the one or more end devices with the new noise profile. Based on either the new noise profile or a matching noise profile of the one or more noise profiles, the computer system may identify at least one noise source on the communication path. In one set of embodiments, the communication medium may be one of a power line at a customer premises, twisted pair cable, coaxial cable, or optical fiber. In other embodiments, the communication medium may be a wireless connection for at least one of Wi-Fi, Bluetooth, infrared, near-field, or Z-Wave communications. According to a set of embodiments, the at least one noise characteristic may include a frequency spectrum of the noise signal, power spectral density, transient markers, time of day of occurrence, or occurrence patterns. In a further set of embodiments, the computer system 500 may further be programmed to identify, based on the new noise profile or the matching noise profile, at least one secondary end device on a second communication path.

In another set of embodiments, the computer system 500 may include in the computer readable media further instructions to identify, at the noise information database, existing noise information associated with the communication path. The computer system 500 may subtract the existing noise information from the extracted noise information resulting in an added noise information, and generate, based on the added noise information, an isolated noise profile associated with the new end device.

According to yet further sets of embodiments, the communication medium may comprise a transmission spectrum, wherein the transmission spectrum includes a plurality of sub-carrier channel, each sub-carrier channel spanning a respective frequency range within the transmission spectrum. The computer system 500 may include further instructions to retrieve, via the noise information repository, extracted noise information respectively from each of the plurality of sub-carrier channels, wherein the extracted noise information is extracted respectively from each of the sub-carrier channels. Then, based on the extracted noise information, the computer system 500 may determine, based on the extracted noise information, a signal-to-noise ratio respectively for each of the sub-carrier channels. The computer system 500 may further be programmed to cancel, from the extracted noise information, a crosstalk noise, wherein the crosstalk noise of a near-end transceiver on the communication path is canceled with the crosstalk noise of a corresponding far-end transceiver on the communication path.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for noise profile generation comprising:
a customer gateway communicatively coupled to one or more end devices over a communication medium;
at least one noise information node, each of the at least one noise information node communicatively coupled to the customer gateway, wherein each of the at least one noise information node is programmed to extract an extracted noise information present on a communication path from the customer gateway to at least one of the one or more end devices, wherein each of the at least one noise information node has a first unique identifier and is further programmed to identify a new end device connected to the communication path;
a noise profile database storing one or more noise profiles, wherein each of the one or more noise profiles is respectively associated with at least one noise source; and
a noise profile generator comprising:
at least one processor; and
non-transitory computer readable media having encoded thereon computer software comprising a set of instructions executable by the at least one processor to:
based on an identification, by the at least one noise information node, that the new end device has been connected to the communication path, identify, based on a corresponding first unique identifier associated with the at least one noise information node and at the noise profile database, existing noise information associated with the communication path, associate a second unique identifier of the new end device with the extracted noise information, subtract the existing noise information from the extracted noise information resulting in an added noise information, and generate, based on the added noise information, an isolated noise profile associated with the new end device, wherein
the second unique identifier of the new end device is one of: a serial number or hardware address of the new end device, and
a crosstalk noise is cancelled from the extracted noise information, wherein the crosstalk noise of a near-end transceiver of the at least one customer node is canceled with the crosstalk noise of a corresponding far-end transceiver of the at least one customer node.

2. The system of claim 1, wherein the set of instructions are further executable by the at least one processor to:
retrieve, from the at least one noise information node, the extracted noise information associated with the communication path;
determine whether the at least one noise characteristic of the extracted noise information matches with one or more noise profiles at the noise profile database;
generate, in response to determining that at least one noise characteristic of the extracted noise information does not match with the one or more noise profiles, a new noise profile based on the extracted noise information;
associate, at the noise profile database, at least one of the one or more end devices with the new noise profile; and
identify, based on either the new noise profile or a matching noise profile of the one or more noise profiles, the at least one noise source on the communication path.

3. The system of claim 1, wherein the communication medium is one of a power line at a customer premises, twisted pair cable, coaxial cable, or optical fiber.

4. The system of claim 1, wherein the communication medium is a wireless connection for at least one of Wi-Fi, Bluetooth, infrared, near-field, or Z-Wave communications.

5. The system of claim 1, wherein the communication medium comprises a transmission spectrum, wherein the transmission spectrum includes a plurality of sub-carrier channels, each sub-carrier channel spanning a respective frequency range within the transmission spectrum, wherein each of the at least one noise information node is a wireless transceiver programmed to:
receive, from the customer gateway, a signal on each of the plurality of sub-carrier channels, wherein the extracted noise information is extracted respectively from each of the plurality of subcarrier channels; and
determine, based on the extracted noise information, a signal-to-noise ratio respectively for each of the sub-carrier channels.

6. The system of claim 5, wherein the transceiver includes at least one of a discrete multitone (DMT) receiver or orthogonal frequency division multiple access (OFDMA) receiver.

7. The system of claim 2, wherein the set of instructions of the noise profile generator further comprises instructions that cause the processor to:
identify, based on the new noise profile or the matching noise profile, at least one secondary end device on a second communication path.

8. The system of claim 1, wherein the extracted noise information comprises at least one noise characteristic, wherein the at least one noise characteristic includes a frequency spectrum of the noise signal, noise spectral density, transient markers, time of day of occurrence, or occurrence patterns.

9. A noise profile generator, comprising:
at least one processor; and
non-transitory computer readable media having encoded thereon computer software comprising a set of instructions executable by the at least one processor to:
based on an identification, by at least one noise information node, of a new end device that has been connected to a communication path, identify, based on a corresponding first unique identifier associated with the at least one noise information node and at a noise profile database, existing noise information associated with the communication path, associate a second unique identifier of the new end device with the extracted noise information, subtract the existing noise information from extracted noise information resulting in an added noise information, generate, based on the added noise information, an isolated noise profile associated with the new end device, and cancel, from the extracted noise information, a crosstalk noise, wherein the crosstalk noise of a near-end transceiver on the communication path is canceled with the crosstalk noise of a corresponding far-end transceiver on the communication path, wherein the second unique identifier of the new end device is one of: a serial number or hardware address of the new end device.

10. The noise profile generator of claim 9, wherein the set of instructions are further executable by the at least one processor to:
retrieve, via a noise information repository, extracted noise information associated with the communication path between a communication gateway and one or more end devices, utilizing a communication medium;
determine whether at least one noise characteristic of the extracted noise information matches with one or more noise profiles at the noise profile database;
generate, in response to determining that at least one noise characteristic of the extracted noise information does not match with the one or more noise profiles, a new noise profile based on the extracted noise information;
associate, at the noise profile database, at least one of the one or more end devices with the new noise profile; and
identify, based on either the new noise profile or a matching noise profile of the one or more noise profiles, at least one noise source on the communication path.

11. The noise profile generator of claim 10, wherein the communication medium is one of a power line at a customer premises, twisted pair cable, coaxial cable, or optical fiber.

12. The noise profile generator of claim 10, wherein the communication medium is a wireless connection for at least one of Wi-Fi, Bluetooth, infrared, near-field, or Z-Wave communications.

13. The noise profile generator of claim 10, wherein the communication medium comprises a transmission spectrum, wherein the transmission spectrum includes a plurality of sub-carrier channel, each sub-carrier channel spanning a respective frequency range within the transmission spectrum, the set of instructions further comprises instructions that cause the processor to:
retrieve, via the noise information repository, extracted noise information respectively from each of the plurality of sub-carrier channels, wherein the extracted noise information is extracted respectively from each of the subcarrier channels; and
determine, based on the extracted noise information, a signal-to-noise ratio respectively for each of the sub-carrier channels.

14. The noise profile generator of claim 10, wherein the set of instructions further comprises instructions that cause the processor to:
identify, based on the new noise profile or the matching noise profile, at least one secondary end device on a second communication path.

15. The noise profile generator of claim 10, wherein the at least one noise characteristic includes a frequency spectrum of the noise signal, power spectral density, transient markers, time of day of occurrence, or occurrence patterns.

16. A method of noise profile generation comprising:
identifying, by at least one noise information node, a new end device that has been connected to a communication path; and
based on an identification, by the at least one noise information node, of the new end device that has been connected to the communication path, identifying, based on a corresponding first unique identifier associated with the at least one noise information node and at a noise profile database, existing noise information associated with the communication path, associating a second unique identifier of the new end device with the extracted noise information, subtracting the existing noise information from extracted noise information resulting in an added noise information, generating, based on the added noise information, an isolated noise profile associated with the new end device, and canceling, from the extracted noise information, a crosstalk noise, wherein the crosstalk noise of a near-end transceiver on the communication path is canceled with the crosstalk noise of a corresponding far-end transceiver on the communication path, wherein
the second unique identifier of the new end device is one of: a serial number or hardware address of the new end device.

17. The method of claim 16, further comprising:
extracting, via the at least one noise information node, noise information present on the communication path from the customer gateway to at least one of one or more end devices, the communication path utilizing a communication medium;
transmitting, via the at least one noise information node, the extracted noise information to a noise information repository;
retrieving, via the noise information repository, the extracted noise information associated with the communication path;
determining, via a noise profile generator, whether at least one noise characteristic of the extracted noise information matches with one or more noise profiles at the noise profile database, wherein each of the one or more noise profiles comprises at least one noise characteristic derived from noise information, wherein each of the one or more noise profiles is respectively associated with at least one noise source;
generating, via the noise profile generator, in response to determining that at least one noise characteristic of the extracted noise information does not match with the one or more noise profiles, a new noise profile based on the extracted noise information;
associating, at the noise profile database, at least one of the one or more end devices with the new noise profile; and
identifying, based on either the new noise profile or a matching noise profile of the one or more noise profiles, the at least one noise source on the communication path.

18. The method of claim 17, wherein the communication medium comprises a transmission spectrum, wherein the transmission spectrum includes a plurality of sub-carrier channel, each sub-carrier channel spanning a respective frequency range within the transmission spectrum, the method further comprising:
retrieving, via the noise information repository, extracted noise information respectively from each of the plurality of sub-carrier channels, wherein the extracted noise information is extracted respectively from each of the subcarrier channels; and
determine, based on the extracted noise information, a signal-to-noise ratio respectively for each of the sub-carrier channels.

* * * * *